United States Patent
Tadros et al.

(10) Patent No.: US 10,304,252 B2
(45) Date of Patent: May 28, 2019

(54) COLLABORATION METHODS TO IMPROVE USE OF 3D MODELS IN MIXED REALITY ENVIRONMENTS

(71) Applicant: TRIMBLE INC., Sunnyvale, CA (US)

(72) Inventors: Michael Aziz Tadros, Boulder, CO (US); Jeffrey Brian Franklin, Louisville, CO (US)

(73) Assignee: TRIMBLE INC., Sunnyvale, CA (US)

( * ) Notice: Subject to any disclaimer, the term of this patent is extended or adjusted under 35 U.S.C. 154(b) by 0 days.

(21) Appl. No.: 15/705,576

(22) Filed: Sep. 15, 2017

(65) Prior Publication Data

US 2019/0088016 A1    Mar. 21, 2019

(51) Int. Cl.
*G06T 19/00* (2011.01)
*G06F 3/0481* (2013.01)
(Continued)

(52) U.S. Cl.
CPC ........ *G06T 19/006* (2013.01); *G06F 3/04815* (2013.01); *G06T 15/20* (2013.01);
(Continued)

(58) Field of Classification Search
CPC .......... G06K 9/00664–9/00704; G06F 3/0481; G06F 3/04817; G06F 9/4443; G06F 3/04847; G06F 11/3664; G06F 3/012; G06F 3/0304; G06F 3/011–3/015; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

2003/0071932 A1*  4/2003  Tanigaki ............... H04N 7/144
                                                         349/61
2012/0249586 A1* 10/2012  Wither ............... H04N 1/00323
                                                         345/633
(Continued)

OTHER PUBLICATIONS

Extended European Search Report for EP Application No. 18193670. 9, dated Jan. 28, 2019.

*Primary Examiner* — Todd Buttram
(74) *Attorney, Agent, or Firm* — Marsh Fischmann & Breyfogle LLP; Kent A. Lembke (57) ABSTRACT

A mixed reality (MR) system that implements methods to allow two or more users to collaboratively access and interact with 3D models in MR environments. The collaboration includes a registration process allowing users to each register their MR system to their present space with 1-click registration. The presenter performs the registration and co-located users can utilize an image of what the presenter was viewing (a registration "photo") to register to the space using the 1-click registration process. Remote collaborators register to a different space using the 1-click registration process. With the collaboration methods, a presenter controls whether or not the collaborators can roam freely from the presenter's current location or are only able to move a predefined amount so as share a view of the 3D model-based MR environment as the presenter. Collaborators are shown lines of sight of the other users and avatars of those that are physically remote.

18 Claims, 7 Drawing Sheets

(51) Int. Cl.
  *G06T 15/20*   (2011.01)
  *G06T 17/20*   (2006.01)
  *G06F 3/0484*   (2013.01)

(52) U.S. Cl.
  CPC ............ *G06T 17/20* (2013.01); *G06T 19/003* (2013.01); *G06F 3/04842* (2013.01); *G06T 2219/024* (2013.01)

(56) References Cited

U.S. PATENT DOCUMENTS

| | | | |
|---|---|---|---|
| 2012/0249741 A1* | 10/2012 | Maciocci | G06F 3/011 348/46 |
| 2013/0234934 A1 | 9/2013 | Champion et al. | |
| 2014/0125698 A1 | 5/2014 | Latta et al. | |
| 2014/0320529 A1 | 10/2014 | Roberts et al. | |
| 2018/0300551 A1* | 10/2018 | Luccin | G06K 9/00671 |

\* cited by examiner

COLLABORATION METHODS TO IMPROVE USE OF 3D MODELS IN MIXED REALITY ENVIRONMENTS

BACKGROUND

1. Field of the Invention

The present invention generally relates to mixed reality (MR) applications and/or augmented reality (AR) applications used to visualize and allow users to navigate through a 3D model of a physical building, building site, or other structure, and, in this description, MR environments are considered to build upon or use AR and virtual reality (VR) tools and technology (or MR may be thought of as a technology that spans VR and AR). More particularly, the present description is directed toward a MR system with tools for enhancing collaboration among two or more concurrent users of a 3D model in a MR environment.

2. Relevant Background

Mixed reality (MR) is the merging of real and virtual worlds to produce new environments and visualizations where physical and digital objects co-exist and interact in real time. MR takes place not only in the physical world or the virtual world, but it is a mix of reality and virtual reality that encompasses both augmented reality (AR) and augmented virtuality (AV) via immersive technology. MR technology interactively blends real world objects with digital content, and MR technology can help users efficiently interpret physical and digital information and the spatial relations between these two types of information. As an exemplary MR technology, the Microsoft Hololens is a headset worn by a user that builds upon holographic computing and advanced sensors and that displays 3D images to the user in the form of holograms while the wearer/user is able to view and move about the surrounding physical world.

Many in the architecture, engineering, and construction (AEC) industry believe that MR will have a significant impact on the AEC industry in the coming years. MR technology addresses some of the industry's inefficiencies during the design, construction, and operation stages. For example, MR technology allows architects and other users to navigate a 3D model (e.g., a building information modeling (BIM) digital representation of physical and functional characteristics of a facility or other physical structure) to allow a planned or existing building/facility to be examined, analyzed, and experienced in an office or remote setting with a mix of physical and digital inputs. MR improves communication, tightens workflow integration, and enables real-time collaboration with collocated and/or remote teams.

In the context of the building industry, MR allows users to span purely virtual and purely real environments such that digital and real content co-exist. For example, architectural design can collide with reality as construction teams work to transform digital content into physical objects. The interpretation of onscreen or printed digital content and its translation to real worlds heavily depends on the user's spatial understanding and their ability to "read" construction documents and computer-aided design (CAD) models. This can be an error-prone process demanding a highly skilled workforce. Interpretation errors are common during the design and construction stages and often result in poorer quality, cost overruns, and schedule delays. Visualizing digital content with MR (e.g., as holograms displayed upon or with physical objects viewed by the user via MR technology) bridges the gap between abstract/virtual and real and reduces current workflow inefficiencies. MR presents the opportunity for an infinite environment in which additional data such as specification and simulation of new structural designs and features can be overlaid onto the real world creating a hyper-reality environment.

The AEC industry is spatial by definition. In the past few years, there has been a transition from two dimensional (2D) documents to 3D models that has improved team communication and coordination. 3D models are common today, but interacting with volumetric data behind a 2D screen is relatively limited. MR, such as that provided via holographic technology and other MR display technologies, can be used to bring the 3D models out of the screen and provide users the ability to engage and interact with the design data in a more intuitive manner. Further, unleashing the 3D model democratizes the data by offering a natural way to experience and understand the design. For example, while years of education and practice may train architects to visualize their designs in 3D, others involved in the building process often have a hard time deciphering the 3D models. Using MR, all those involved in the process can walk around in and experience the designed building/structure in real 3D without the need for an expert to guide them.

As will be appreciated, though, the effectiveness and efficiency of the use of MR in AEC and other applications is constrained by the ease at which the user of the MR technology (e.g., a wearer of an MR headset such as a Microsoft Hololens or the like) is able to work collaboratively with other users of a 3D model in the MR environment (such as a BIM environment). Presently, users often will sequentially or separately work with the 3D model. In other cases, users will concurrently access a 3D model but have difficulty trying to see or experience the 3D model from a shared viewpoint. This is especially a challenge when one or more of the users are in a remote or different location or work space (e.g., a user is in another building, another city, or even another country).

Hence, there remains a need for tools to allow users of MR technology to efficiently work together as a team within a 3D model environment in a manner that is easily controlled by one of the users (e.g., a "presenter" or a "collaboration session leader" or the like) and in a manner that is easily initiated and repeated for each new work session. Further, it is desirable for the tools to be configured for facilitating collaboration workflows for other attendees that join the "presenter" in the 3D model environment.

SUMMARY

Briefly, the inventors recognized that it would be desirable to allow two or more users that are concurrently accessing and navigating a 3D model (such as a 3D architectural model, a BIM model, or the like) to more effectively collaborate. The navigated environments are labeled mixed reality (MR) environments or displayed 3D model imagery in this description, and this is intended to include virtual reality (VR) and augmented reality (AR) applications and technologies (e.g., the term MR is used in an inclusive manner to include VR and AR).

To facilitate presenter-controlled collaboration, an MR system is described that implements new collaboration methods for 3D models in MR environments. These collaboration methods allow a user to act as a collaboration leader or presenter and control navigation by themselves and their co-users about a 3D model (such as an MR environment including one or more buildings/structures) while in an MR environment. The collaboration methods or tools provided by the MR system include 1-point registration of the users to a 3D model and/or a current space. The collaboration methods or tools further include a suite of features provided while the MR system operates in a presenter mode to provide new capabilities that a presenter can utilize to facilitate useful collaboration between the two or more co-users (or collaboration team members).

More particularly, a system is described herein for providing a mixed reality (MR) environment with collaborative and concurrent access to the MR environment. The system includes a display element and memory storing a three dimensional (3D) model (e.g., one selected by a presenter/user for use in a particular collaboration session). The system includes a processor running a collaboration control module receiving from a user a request to initiate a collaboration session with the 3D model or to join the collaboration session and, in response, operating the display element to display an image generated from the 3D model to augment a view of a physical space in which the user is positioned. The collaboration control module operates the display element to display a prompt to register the user within the physical space. Further, the collaboration control module receives a user selection of a location in the physical space and, in response, registers the user to the physical space.

In some embodiments, the collaboration control module registers the user to the physical space using a 1-click registration algorithm. In such embodiments, the 1-click registration algorithm may include operating the display element to prompt the user to select a location on a vertical surface in a surface reconstruction mesh of the physical space. Then, the 1-click registration algorithm may include receiving a location selection on a vertical surface in the surface reconstruction mesh and processing the location selection to determine a location on the vertical surface and a normal to the vertical surface to register the user to the physical space. Further, in some cases, the collaboration control module captures an image of the physical space from a viewpoint of the user during the receiving of the location selection, and the collaboration control module prompts a second user running a collaboration control module on a local MR system and located in the physical space to register the 3D model to the physical space by aligning a displayed copy of the image with a current view through the local MR system of the physical space. In these or other cases, the collaboration control module receives a location selection from the user for a point in the physical space and, in response, anchors the 3D model to the physical space.

The collaboration control module may operate, in response to input from the user, in a first operating mode in which other active users in the collaboration session have their location or view tethered to a location or view of the user relative to the 3D model and in a second operating mode with which the other active users are able to roam independently relative to the 3D model. In the same or other embodiments, the collaboration control module operates to monitor locations of other users in the collaboration session and, in response, to generate and display an avatar for each of the other users in the display element of the user. In some embodiments, avatars are displayed in a conditional manner depending on whether users are collocated (in which case no avatars are displayed for other ones of the collocated users) or remotely located (in which case avatars are displayed). Also, the collaboration control module may operate to monitor locations and lines of sight of other users in the collaboration session and, in response, to display a linear element in the display element representing the lines of sight of the other users from the monitored locations.

DETAILED DESCRIPTION

In the following description, methods are taught for more efficiently and effectively collaborating with other concurrent users of a mixed reality (MR) environment that is provided by an MR system (or device) based on a digital 3D model such as an architectural model, a BIM model, a model of a product, a model of furniture layout, or the like. The methods may be implemented using presently available MR devices such as, but not limited to, the Microsoft Hololens, and, hence, the description and following claims are also directed to such devices/systems implementing the enhanced collaboration methods.

Briefly, the improved collaboration in an MR environment using an MR system may include a new registration process that is configured to allow users to each register their MR system to their present space with 1-click registration. The presenter performs the 1-click registration and then co-located users can utilize an image of what the presenter was viewing (a registration "photo") to register to the space in a similar manner (e.g., by selecting the same location or spot on a vertical surface of a surface reconstruction mesh of the space as the presenter) using the 1-click registration process. Remote collaborators or users will register to a different space using the 1-click registration process and then later collaborators/users in this same space (which is remote the space used by the presenter) can use a process similar to the co-located users but using this first registered remote user's registration photo.

The collaboration methods taught herein also include a number of new and unique collaboration functions. For example, a presenter is able to control whether or not the collaborators (or other users of the MR environment and a particular 3D model) can roam freely from the presenter's current location or whether they are only able to move a predefined amount so as share a view of the 3D model-based MR environment as the presenter. The presenter also has the ability to call back the collaborators/other users, after they have been allowed to freely roam or move about the MR environment, to a location proximate to the presenter in the MR environment. To assist in collaboration, avatars of the collaborators who are physically located in a remote space will be shown to each of the other collaborators/users in their displayed model-based images (e.g., as part of the augmentation of the space along with the 3D model). In some cases, a sight line is visually displayed in the displayed model-based images to represent to each user/collaborator where the other users/collaborators are looking within the 3D model or 3D environment (or a subset of the collaborators'/users' sight lines may be shown in the displayed model-based images) as another augmentation to facilitate effective collaboration.

Figure 1:
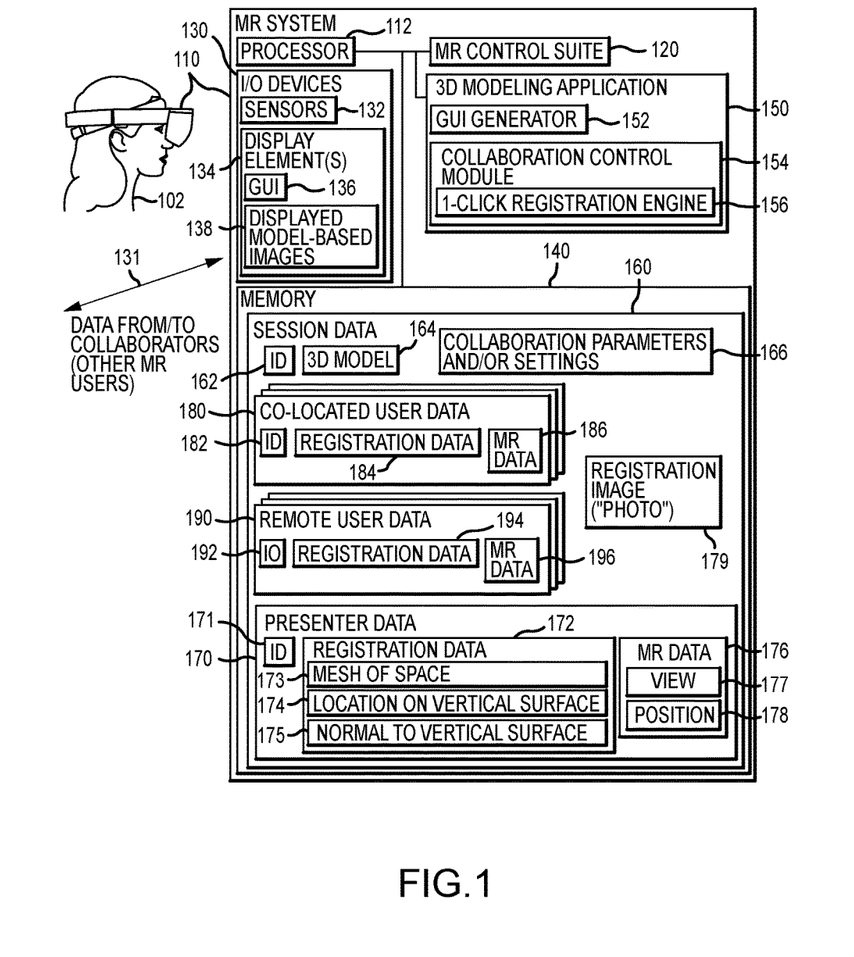
FIG. 1 illustrates a user wearing/using an MR system (e.g., an MR headset) and further illustrates a functional block diagram of an exemplary implementation of such an MR system according to the present description to facilitate collaborative access to a 3D model and MR environment associated with that 3D model.

FIG. 1 illustrates a user 102 operating or using an MR system (or device) 110 to visualize and explore an MR environment by navigating the MR environment according to the present description and new navigation techniques. One user 102 is shown who may be a presenter/leader of a collaboration session, but it should be understood that additional users/collaborators 102 typically will be present with an MR system 110 that operates similarly to allow two or more such users 102 to concurrently access an augmented reality that is based on a 3D model selected by the presenter 102. FIG. 1 illustrates both one useful physical implementation of the MR system 110 in the form of a headset MR device and a functional block diagram of such an MR device (with the functional block description applying to other particular MR system implementations and is not limited to the illustrated headset MR device).

As shown, the MR system 110 may take the form of a headset such as the Microsoft Hololens or the like, but it should be understood that collaboration sessions can also be conducted across device types, e.g., User A is on a mobile tablet and User B is wearing a Hololens headset and so on. The headset may include built-in sensors 132 that allow the user 102 to use their line-of-sight or gaze to move a cursor (or other selection device in a displayed graphical user interface (GUI) in the headset) to interact with displayed portions/images of an MR environment. The built-in sensors 132 may also allow the user 102 to use gestures made by their hands (such as pointing or a thumb-forefinger pinch) to interact with the MR environment (e.g., to select apps, drag and drop images/holograms, and so on in the MR environment or its displayed images). In other embodiments (not shown but as may be implemented using the functional box MR system 110), the headset may be replaced with other display technologies such as a heads-up display, a handheld device (such as a mobile phone, a handheld PC, tablet, or the like, and so on), a desktop computer display, and an MR-dedicated space (such as the Cave Automatic Virtual Environment), as each of these MR technologies may be used to provide an MR environment based on a digital 3D model (e.g., 3D model 164 chosen by the presenter 102 for a session defined by session data 160) that may be navigated by the user of the MR technology. Many of these MR technologies include a display element (e.g., display element 134 in FIG. 1) that is or includes a transparent display element/monitor that allows the user 102 to concurrently see displayed information (e.g., a GUI, 3D or 2D imagery from a digital model, and so on) 136 and their surrounding environment. Others, such as tablets, may provide video see-through rather than a transparent display.

Turning now to the functional block diagram of the MR system 110, the system 110 includes a processor(s) 112 that manages hardware components such as memory 140 and I/O devices 130 and also executes code/software/programs/applications to provide the MR system functionality. Particularly, the MR system 110 includes software in the form of an MR control suite 120 that functions to process a digital 3D model 164 (such as a BIM model or the like) to generate imagery (e.g., 3D images) 138 that is displayed on a display element 134 for viewing by the user 102 concurrently with their surrounding physical environment (except in VR implementations) often concurrently with a GUI 136 (generated by the MR control suite 120 and/or by the GUI generator 152 of the 3D modeling application 150).

The sensors 132 may include gesture recognition, tracking components (such as for following a user's gaze, and movements (e.g., walking within the MR environment), and the like), and outputs from these sensors 132 are processed by the MR control suite 120 to determine how to modify the MR environment by selecting differing portions or views (or sizing) of the 3D model 164 to display as shown at 138 in the display element 134 to the user 102. The MR control suite 120 also processes the input from the user 102 to determine MR data 176 for the user/presenter 102 including a current user location 178 in the 3D model 164 (or relative to the 3D model 164) and a view 177, and this location 178 is used by the MR control suite 120 along with the sensed user gaze/line of sight 177 to provide the displayed model-based images 138 in the display element 134 based on data in the 3D model 164. Typically, the I/O devices 130 such as sensors 132 are used by the MR control suite 120 to sense user input from user 102, and this input may be determined to be a selection of a portion of a displayed GUI 136 (e.g., a selection of a drop down menu item or other trigger element to select initiation of an app or an operating mode/feature such as the collaboration functions such as 1-click registration described herein).

The processor 112 further runs software or executes code (in memory 140) to provide functions of a 3D modeling application 150 during operations of the MR system 110. The 3D modeling application 150 includes a GUI generator 152 (or may include a subroutine that collaborates with GUI generator of the control suite 120 in some implementations), and the GUI generator 152 is used to update the GUI 136 displayed by the display elements 134 with the model images 138. This GUI 136 is used to provide menu elements for use by the user 102 to navigate an MR environment that includes the model-based images 138 by choosing navigating modes/features such as a conventional walk navigation mode/feature (such as when a presenter 102 has chosen collaboration parameters and/or settings 166 that allow other users/collaborators 102 to roam freely in the 3D model 164).

With significance to the present description, the 3D modeling application 150 further includes a collaboration control module 154 that operates the system 110 to allow and facilitate collaboration among two or more of the users 102. One of the users 102 is a presenter that leads a collaboration session that is defined by a set of session data 160 stored in memory 140 while the other users 102 are either co-located users in the same space as the presenter/user 102 or remote users in a different space that is remote or spaced apart from the presenter's space. The collaboration control module 154 includes a 1-click registration engine 156 that is adapted to register the user 102 (e.g., the presenter first and then co-located users 102 or a remote user to a different space) to the space they are presently viewing or positioned within during use of the MR system 110.

During operations of the MR system 110, the collaboration control module 154 acts with the GUI generator 152 to provide a GUI 136 that allows a user 102 to initiate a collaboration session that is defined by a set of session data 160 stored in memory 140. The GUI 136 encourages the user/presenter 102 to assign an ID 162 to the session (or this may be done automatically by the collaboration control module 154), and the user/presenter 102 is asked via the GUI 136 to choose a 3D model 164 for use in the collaboration session 164. This 3D model 164 is used by the 3D modeling application 150 to generate the displayed model-based images 138 on the display element 134 of the MR system 110. A set of presenter data 170 is stored by the collaboration control module 154 for use in controlling and providing the collaboration session associated with session data 160, and this data 170 includes an ID 171 for the presenter 102, which may be used to distinguish the user 102 from other users in the session and/or may be used to facilitate communications 131 between the presenter 102 and collaborators (not shown but understood to be similar in form to user 102 each using a MR system 110). The collaboration control module 154 further determines which users/collaborators are collocated (to each other/the presenter) and which are remotely located (relative to each other/the presenter), and this data is used in generating the GUI including whether or not to display avatars (for remotely located users) or only sight lines (for collocated users).

The 1-click registration engine 156 is configured to provide registration of the user 102 (or, more accurately, the headset/MR system 110) with the space they are currently positioned within and viewing through the display element 134. The registration engine 156 acts to generate and store a set of registration data 172 for the present/user 102 in memory 140. This data includes a surface reconstruction mesh 173 of the space currently being viewed by the user 102 through the display element/eyepieces 134 of the MR system 110. The mesh 173 typically includes horizontal and vertical surfaces, and the registration is "1-click" in that the user 102 is prompted via the GUI 136 to select a location or small spot/object on a vertical surface in the mesh 173 to initiate registration to the space.

The GUI 136 may be generated so as to indicate to the user 102 which surfaces are acceptable or valid for selection in the 1-click registration process (e.g., by coloring or shading the vertical surfaces only in the mesh 173, which may be overlain upon the physical space viewed by the user/presenter 102 through the display element/eyepieces/lenses 134). The user selects a spot/object on one of the vertical surfaces with selection determined or sensed by sensors 132 based on user input (as discussed above), and the registration engine 156 stores the location on the vertical surface as shown at 174 as well as a normal to the vertical surface including this location as shown at 175. The registration engine 156 processes the location 174 in combination with the normal 175 to register the user 102 (or the MR system 110) to the viewed space. The sensors 132 are used by MR control suite 120 to collect MR data 176 for the presenter 102 for use in generating the displayed model-based images such as their light of sight/viewpoint 177 into the space (and 3D model 164 registered to the space) and their present position in the space (and/or relative to the 3D model 164).

An image or "photo" 179 is also captured of the space observed by the user/presenter 102 at the point in time when they select the registration location/spot upon a vertical surface. The registration photo 179 is provided to later joining users/collaborators that are co-located with the presenter to assist in registration. As shown, a set of data 180 is generated and stored for each user that is determined to be co-located with the presenter/user 102. All or a subset of this data 180 may be stored on that co-located user's MR system 110 as each MR system 110 worn by a user 102 functions to generate a displayed model-based image 138 for each user using the 3D model 164 chosen by the presenter 102 but based on that user's registration to the space and their MR data. To this end, the co-located user data 180 is shown to include an ID 182 that may be used for identifying and/or communicating 131 among the MR systems 110. Also, the data 180 includes registration data 184, which may be similar to the registration data 172 for the presenter 102.

Particularly, the co-located user 102 may be prompted with a display of the registration image/photo 179 in their GUI 136 to choose the same location/spot on the same vertical surface as the presenter 102 did in their registration process. Based on user input from the co-located user, the registration engine 156 will determine a location and a normal to the vertical surface from the co-located user and store this in the registration data 184, and this registration data 184 is then used to register the user (or their MR system 110) to the space. During operations, MR data 186 similar to MR data 176 for the presenter 102 is collected/determined for the co-located user and used to generate a proper view of the 3D model 164 when generating the displayed model-based images 138 for each co-located user.

Similar data 190 may be stored in memory 140 (or in the MR system worn by the user 102) for each remote collaborator/user 102 in the session defined by session data 160. Particularly, an ID 192 is stored identifying the remote user and facilitating communications 131 with or from that remote user. Registration data 194 is also stored and may include a chosen vertical surface in a mesh of the user's surface chosen by the remote user, a location/spot on this vertical surface of the mesh of the space, and a normal from the user/their MR system 110 to the location/spot on the vertical surface from the remote user's current position in the remote space. This registration data 194 is used by the 1-click registration engine 156 of the user's MR system 110 to register the user (or their MR system 110) to the remote space. The remote user data 190 may also include tracked/determined MR data 196 that is used by the 3D modeling application 150 in generating the displayed model-based images 138 for display on this user's display element 134 based on the 3D model 164 defined for this collaboration session. In practice, the remote user data 190 (such as one or more of the ID 192, the registration data 194, and the MR data 196) is used to help render the remote user's avatar for the benefit of the other collaborators (e.g., the collocated users associated with data 180).

As shown, a set of collaboration parameters and settings 166 are also stored in memory 140 as part of the session data 160. The collaboration control module 154 may be configured to provide a set of new collaboration functions to the presenter of a collaboration session. To this end, the GUI 136 may present collaboration settings and parameters 166 that the presenter/user 102 may accept or modify to initiate particular functions/features carried out by the collaboration control module 154 during the collaboration session defined by or associated with session data 160. For example, the non-presenter users associated with user data 180 and 190 may be allowed to roam/move about the 3D model 164 (or AR environment generated based on the model) or may be restrained to only move within a predefined volume relative to the presenter's location/position within the 3D model 164 (or AR environment generated based on the model). One of these two operating modes may be set in the parameters/settings 166.

In another example, the presenter may be able to force the collaborators/users to return to this predefined volume/space relative to their current location/position within the 3D model (or AR environment), and this may be done by selecting a setting or parameter in a GUI 136 or by switching from free roaming (independent movement) collaboration mode to restrained/tethered movement collaboration mode. In some embodiments, the presenter is free to roam/move within the 3D model 164 (or in the AR environment generated based on the model), and, when in the tethered or restrained collaboration mode, the other users (remote and local) would be pulled along with the movement of the presenter/user to remain within a predefined distance of the presenter.

To facilitate collaboration, the collaboration control module 154 may act to augment the displayed model-based images 138 of the various collaborating users. Such augmentation may be performed based on the MR data gathered/determined for each user. For example, the module 154 may generate the images 138 to include avatars of each of the other users in the session relative to the 3D model and the viewing user's current position in the corresponding AR environment (e.g., only see avatars of collaborating users that are virtually nearby and/or physically located remotely, via such augmentation). In some embodiments, the module 154 generates the images 132 to include a representation of a line of sight of each of the other co-located users so that each user can readily know where the other users are looking within the 3D model, and this line of sight representation/element may be generated from the current position of the other user so as to extend outward from their MR system 110 into the 3D model-based image 138. A user does not see their own line of sight in the GUI, but, in some implementations, they are shown in their display a dot (or other symbol/graphic element) indicating their own "gaze" so that they know where others will believe they are looking (i.e., based on representations of lines of sight shown in the others' GUI/displayed imagery).

Figure 2:
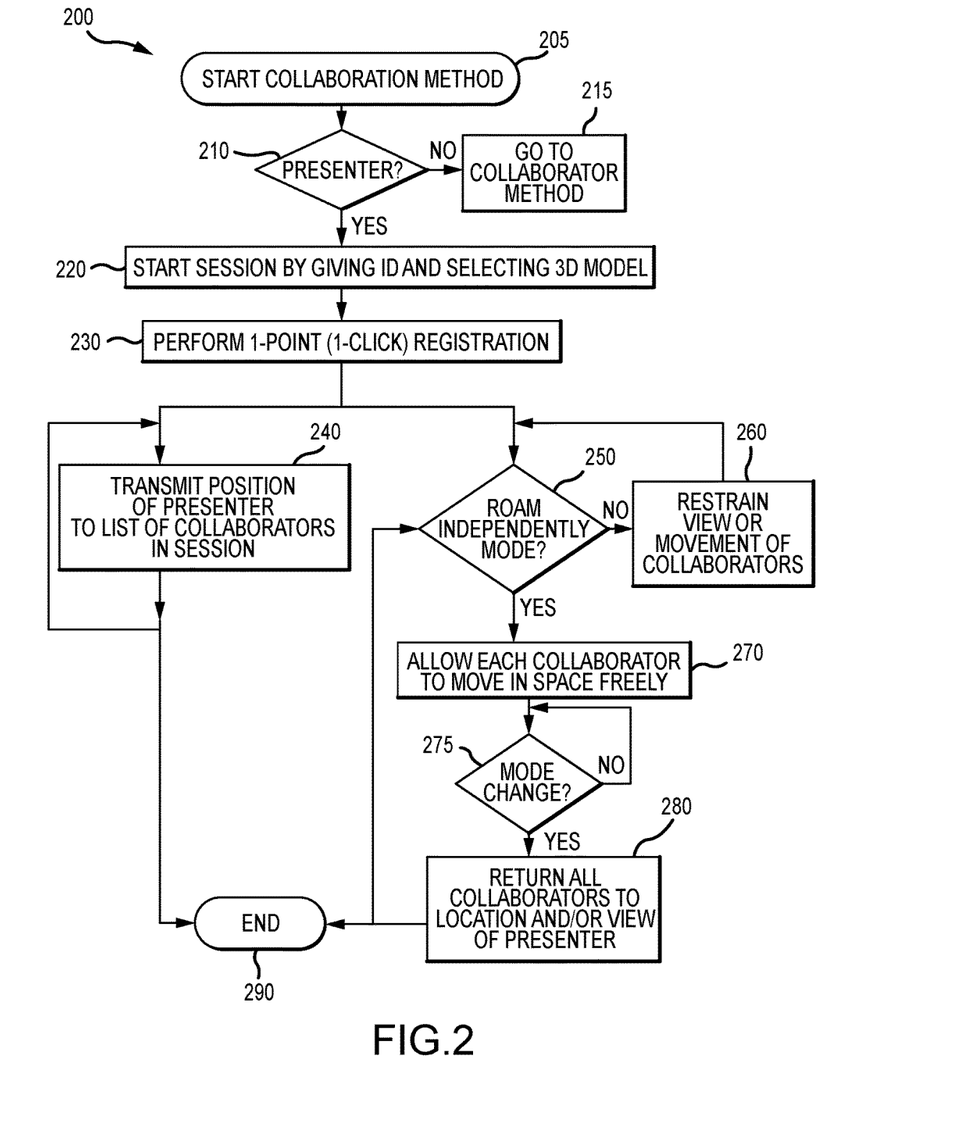
FIG. 2 is a flow diagram of a presenter portion of a collaboration method of the present description such as may be carried out by operation of the MR system of FIG. 1.

FIG. 2 is a flow diagram of a presenter portion of a collaboration method 200 of the present description such as may be carried out by operation of the MR system 100 of FIG. 1. The method 200 starts at 205 such as with an MR system being chosen that has a collaboration control module with a 1-click registration engine loaded for use by the 3D modeling application (as shown at 154 and 156 in system 100 of FIG. 1). The user at 205 turns the MR system on and places it upon their head to position the display element(s) over their eyes. The user in step 205 also will typically position themselves within a space chosen for a collaboration session such as a conference room, construction/project site, or area of a building with room for other users but nearly any space may be utilized for collaboration sessions.

Figure 5:
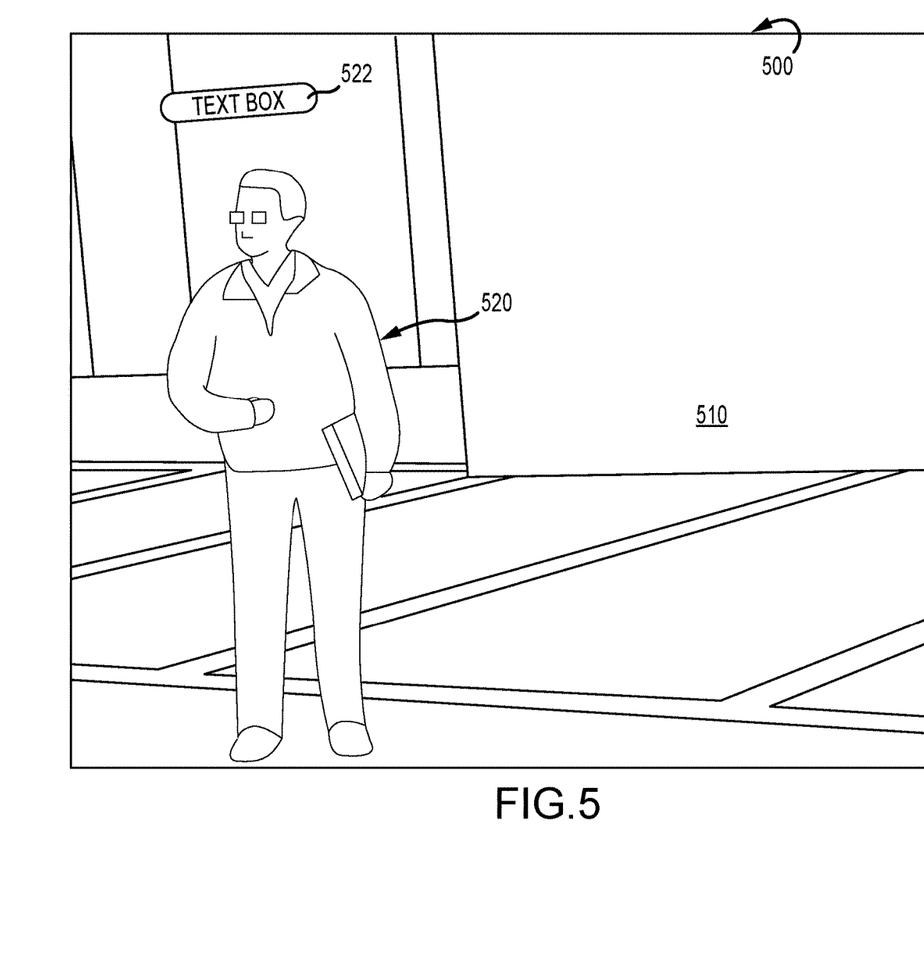
FIG. 5 illustrates a screen shot of a user's view through a display element of an MR system during a collaboration session (note that FIG. 5 could also show the difference between how a user might see a collocated collaborator (e.g., sight line only to other collocated users/collaborators) versus a remote collaborator (e.g., avatar plus sight line displayed to other users/collaborators))

The method 200 continues at 210 with the user indicating, such as via a GUI generated by a 3D modeling application (such as the application 150 with its GUI generator 152), whether or not they are going to act as the presenter/leader of the collaboration session. If not, the method 200 continues at 215 with performing a collaborator portion of the collaboration method (e.g., as shown in FIG. 5). If yes at 210, the method 200 continues at 220 with starting a MR collaboration session. Step 220 may include the presenter giving the session an identification (ID) or this may be performed automatically by the collaboration control module. The presenter in step 220 will also select, and retrieve from local or remote memory if necessary, a 3D model for use in the collaboration. This selected 3D model (such as model 164 shown in FIG. 1) is used by the 3D modeling application 150 in generating displayed model-based images (such as images 138) that are displayed to the presenter on their MR system (such as system 110). This 3D model is also used for displaying imagery to other users (collaborators) that later join the collaboration session started in step 220.

Figure 3:
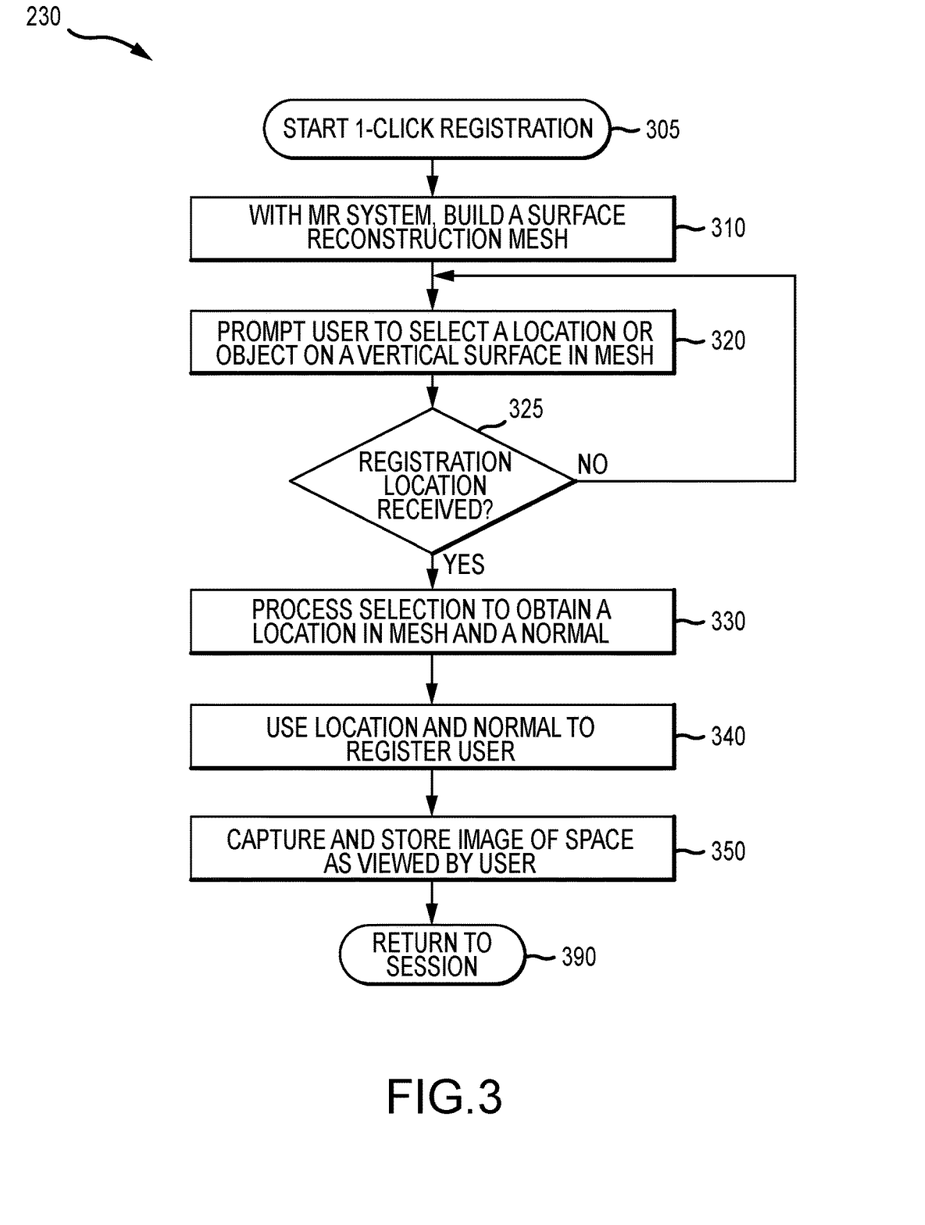
FIG. 3 is a flow diagram of a 1-click (or 1-point) registration of a presenter (or a first remote user/collaborator) during a collaboration session.

The method 200 continues at 230 with registering the user (or their MR system) to the space in which they are currently located and are viewing through the lens/display element of the MR system (i.e., that will be used during the collaboration session). FIG. 3 illustrates the 1-point (or 1-click) registration process 230 in more detail. Registration 230 starts at 305 such as with the collaboration control module 154 calling the 1-click registration engine 156 in system 100. Each MR system (such as system 110 in FIG. 1) starts out with its own coordinates or coordinate system for defining the space presently viewed by a wearer of the MR system (and defined/sensed by onboard sensors or I/O devices), and, while it is conventional that the MR system does not include a compass, each MR system is typically configured so that each MR system is able to determine which way is down in the space via a common accelerometer sensor 132.

With this in mind, the registration process 230 continues at 310 with the MR system (e.g., a Hololens worn by the presenter) operating to build a surface reconstruction mesh of the space being viewed by the presenter through the MR system (e.g., its display element 134 which also acts as a lens to the space for the presenter). The built mesh includes horizontal, vertical, and other surfaces, but, since the MR system knows which way is down, the vertical surfaces can more readily be utilized for registering the presenter/presenter's MR system to the viewed space. Step 320 of the registration process 230 includes prompting the user to select a location (point) or object on a vertical surface in the mesh for use in registering the user/MR system to the space. At step 325, the method 230 includes determining whether or not a selection of a location/point/object on a vertical surface has been received. If not, the method 230 continues at 320 with prompting the user to make a selection. If the user chooses a location/point that is not on a valid vertical surface in the mesh, the GUI may be updated to display an error message and asking the user to try again (e.g., "The selected location is not on a vertical surface. Please select a location or small object on a vertical surface.").

Figure 4:
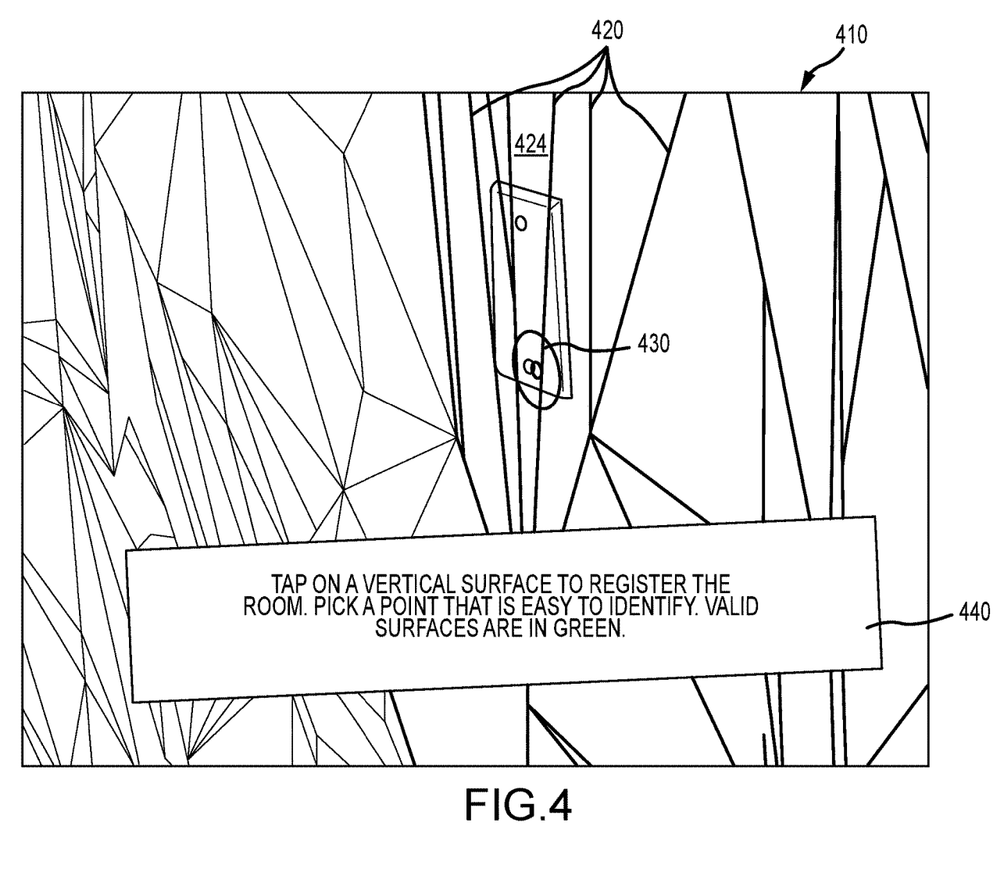
FIG. 4 illustrates a screen shot of a user's view through a display element of an MR system of a space augmented with an exemplary graphical user interface (GUI) during a registration process.

FIG. 4 illustrates a screenshot of a view 410 through an MR system's display element/lenses that is augmented with an exemplary GUI. The GUI may be displayed to a user during step 320 of registration 230 in the display element of the MR system they are wearing so as to augment the physical space and its features including its surfaces. Particularly, the view 410 is augmented to include boundary lines 420 from the built mesh from step 310 that define one or more valid vertical surfaces 424 (which are typically planar surfaces that are orthogonal to the ground or floor) for use in the registration 230, with invalid surfaces (e.g., horizontal and other non-vertical surfaces) not being highlighted in the GUI. For example, the mesh may be colored to outline valid vertical surfaces and left gray or not brightly colored for other mesh lines. A text or instruction box 440 may also be displayed in the GUI or as an augmentation in view 410 to urge the user to select (such as by tapping or the like) a single point/object/location on a vertical surface that is easy to identify (such as a light switch, a particular spot on a wall, a corner of a power socket, and the like). At 430, the view 410 is shown to include an augmentation in the GUI showing the location/point/object selected by the user for registration (e.g., the "1-point" or a location chosen with "1-click"), with this selection being received at step 325 of the registration 230.

The registration 230 continues at 330 with the registration engine (e.g., engine 156) processing the received point selection on the mesh to obtain and/or determine both a location on a valid vertical surface and a normal. The normal generally lies in a horizontal plane and is a direction that corresponds to the direction the valid vertical surface containing the location is facing in the space. The location provides the registration engine with a translation offset between two users that are co-located in a space, with one potentially being the presenter. The normal is used to provide the rotational offset between two users that are co-located in a space. This information is used to assist in registration of a next co-located user that joins the collaboration session so as to register the two MR systems being worn by the two co-located users.

At this point in the method 230, the user is now registered with the space. The method 230 continues at 350 with capturing and storing an image (or "photo") of the space as viewed by the user at the point of selection of the location/point in steps 320, 325 (e.g., step 350 may be performed concurrently with step 325), and this registering or aligning photo is used as an aid to help alignment of a co-located user with the presenter (or first to register in a space), and it will be displayed to the later registering user via their MR system as part of their 1-point registration. The method 230 then continues at 390 with returning control to the collaboration session (e.g., to the collaboration control module 154 for performance of step 240 in FIG. 2).

At step 240, the MR system of the presenter operates to determine (or retrieve from memory) the current position (e.g., coordinates) of the presenter in the space and often their current view (or viewpoint defined by how they or their MR is oriented) in the space. This data is transmitted to all the other users (e.g., collaborators) in the collaboration session. In response, each of these recipients has their MR system operate to, when they are located remote to the presenter, display an avatar of the presenter in their space relative to the presently displayed portion of the 3D model. Also, the line of sight of the other collaborators/users is displayed for remote and collocated collaborators/users. This step is repeated on a continuous or nearly continuous basis (e.g., once every several seconds or less) after registration is completed at 230 and while the session remains active/open.

For example, FIG. 5 illustrates a screen shot 500 of a user's view through a display element of an MR system during operation of the MR system to provide a collaboration session. In this exemplary operating mode, a first user has received MR data such as another user's or second user's location in the same space and their viewpoint or orientation of their MR system. The first user is able to see through the display element of their MR system to see the surrounding space 510, and the MR system concurrently operates with such viewing to augment the space with an avatar 520 of the second viewer. The avatar 520 may be labeled with an ID 522 for the second viewer, and the avatar 520 is positioned and oriented based on the received MR data (e.g., the second person's coordinates and how they are oriented in the space (or how the MR system they are wearing is oriented)). The person wearing the MR system providing the view/image 500 sees the avatar 520 based on their present viewpoint in the space or their currently sensed MR data, and, if they were to turn their head far enough to the left or right the avatar 520 would no longer be included by the MR system in the augmented content/imagery of the space 510. Note, this typically only occurs if the collaborator is remotely located (since users do not generally see avatars of collocated collaborators/users).

Returning to the collaboration method 200 of FIG. 2, the method 200 continues at 250 with determining whether or not the presenter has set the roam freely collaboration mode on or off. For example, a GUI may be generated in the method 200 to present all of the collaboration parameters/settings that a presenter can define during a collaboration session. One such parameter/setting may be to either allow the other collaborators/users to roam freely in their spaces to explore the 3D model or to restrain their movement to share the view being presented to the presenter (a location relative to the 3D model) and/or to allow them a small amount of movement in the space to continue to view a portion of the 3D model. If the roam freely (and independently) setting is not set at 250, the method 200 continues at 260 with collaboration involving each of the collaborators viewing the 3D model in the same way as the presenter or as having a view of a predefined portion of the 3D model and having movement limited to a predefined distance relative to the presenter's location. The method 200 then continues with repeating step 250.

If at 250 it is determined that the roam freely setting has been chosen by the presenter, the method 200 continues at 270 with the collaboration control module allowing each user/collaborator in the session to move within their own space to explore the shared 3D model. Each of their local MR systems will generate imagery based upon the same 3D model, but each user may be in a different location within the 3D model. In some embodiments, each user/collaborator will continue to hear speech of the presenter as the presenter's MR system (or its I/O devices) operate to transmit sound from the presenter's microphone to all other active users/collaborators (or their MR systems) in the session for playback by their MR systems (or the I/O devices such as over the MR system speakers). Each user will be able to view avatars and lines of sight of other remote users/collaborators that have a location within the 3D model that would result in them to be visible to the user at their current location within the 3D model and with their current orientation or viewpoint (with each of the users' MR system operating to communicate their current location within the 3D model or VR environment to the other users in the active collaboration session).

The method 200 continues at 275 with determining whether the presenter has changed the collaboration mode (i.e., to a setting of no independent roaming/movement). If not, the method 200 continues at step 270. If yes, the method 200 continues at 280 with each of the collaborators/users being returned to (or popped back to) the location and/or view of the presenter. The method 200 then ends at 290 or continues with step 250.

Figure 6:
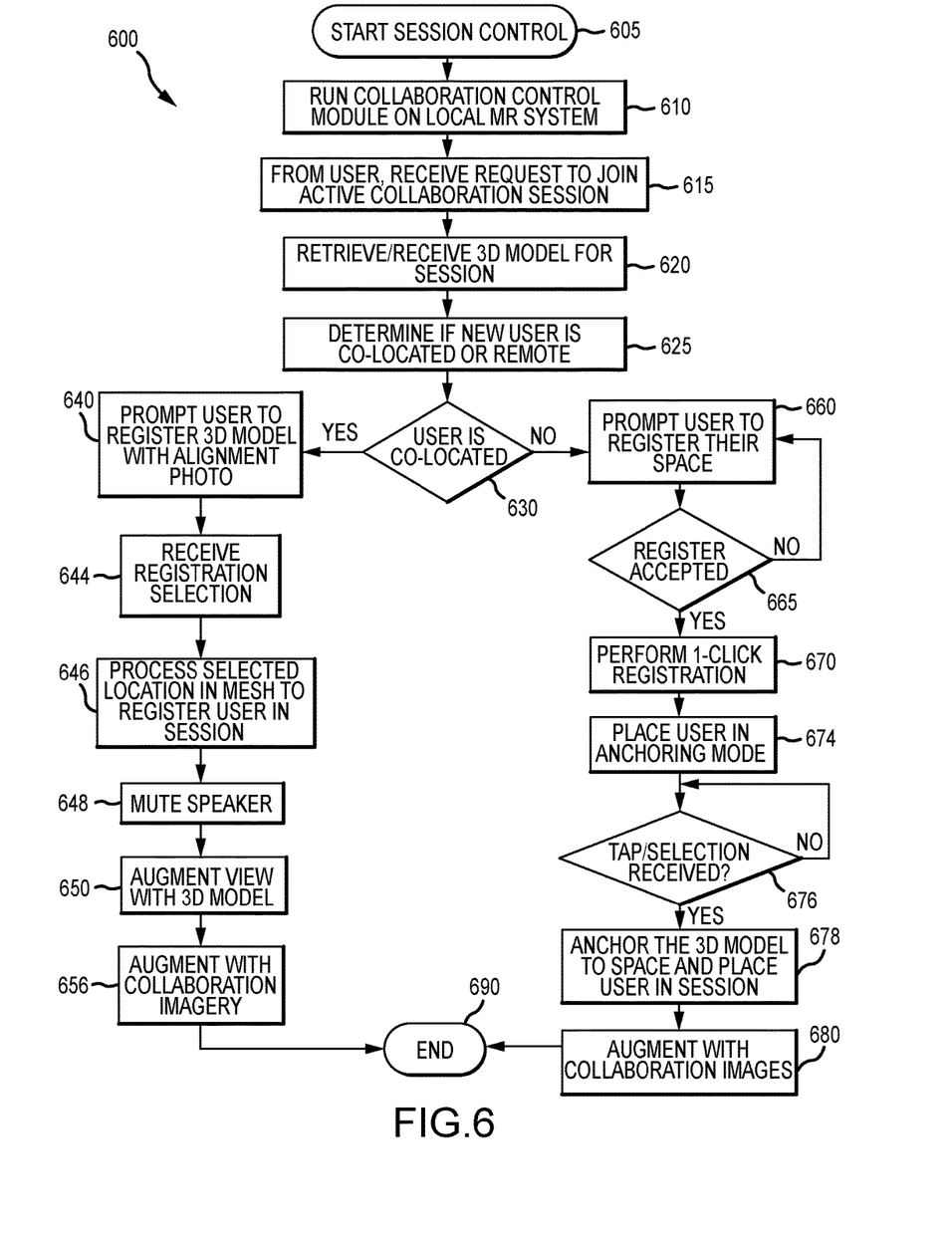
FIG. 6 is a flow diagram for a method of running or controlling a collaboration session after the session is initiated by a presenter.

FIG. 6 is a flow diagram for a method 600 of running or controlling a collaboration session (e.g., by a collaboration control module as shown at 154 in FIG. 1) after the session is initiated by a presenter (as discussed with regard to method 200 of FIG. 2). The method 600 starts at 605 such as with a second (or later) user placing an MR system (or portion thereof) on their head, and this MR system is configured to provide a 3D modeling application with a collaboration control module. The user or collaborator may be in the same space as the presenter or in a remote space (where they may be the first user/collaborator in that space or a second or later user/collaborator in that space, which will affect their registration).

At 610, the collaboration control module is initiated or run on a user's local MR system (e.g., a Microsoft Hololens or the like), and, at 615, this module receives a request to join an active collaboration session such as by entering a session ID or choosing from a list of presently active sessions displayed in a UI that are available to the user. At 620, a 3D model associated with the chosen collaboration session is retrieved/received at the local MR system for use by the 3D modeling application in generating and displaying model-based images to the user/collaborator. The user is now considered to have joined the collaboration session, and the collaboration control module acts to control their experience in the session based on whether the user is co-located with the presenter or the user is in a space that is remote to the session's presenter.

Hence, at 625, the method 600 continues with determining whether the new user is co-located or remote with relation to the presenter's registered space. Step 625 may involve a variety of techniques for discovering other users in the session and their current location relative to the new user and their MR system. In one embodiment, step 625 involves the control module looking to see other MR systems running the application/control module. When these other MR systems are found, the control application on the local MR system acts to determine whether these other control applications are running with a matching session ID. If so, the control module on the local MR system acts to determine whether the MR system is co-located such as by determining whether the other MR system is on the same communication network (e.g., on the same WiFi network, on the same local area network (LAN), or the like). If so, the new or joining MR system is defined as being "local" or co-located with the presenter at step 625. If the algorithm fails on any of these last two tests, the joining/new MR system (and its user) is defined as being remote to the presenter (and their MR system).

Then, at 630, the method 600 involves routing the control to either a co-located user or a remote user. If co-located or local, the method 600 continues at 640 with operating the MR system to prompt the user (such as via a GUI in a display element) to register the 3D model with the alignment or registration photo obtained during registration processes earlier performed for the presenter by their MR system and collaboration control module. The user is prompted to register the 3D model in the same location as did the presenter. To this end, the alignment photo is displayed in the display element of the new user's MR system for viewing with the physical space, and the new user attempts to align the photo with their view of the local physical environment/space.

Then, the new co-located user makes a selection of a location/object in their space to initiate 1-click registration (as discussed above). In practice, the 1-click registration module may use the location and normal as part of the registration process of the presenter or other earlier-registered co-located user so as to register the two MR systems (e.g., two Hololens devices). In some cases, the presenter or another co-located user in the space may speak during the new user's registration to encourage him/her to select the same location/object (e.g., by stating "I tapped on X so you should, too" or the like). Then, the second user/collaborator aligns his/her gaze on the same point, and this acts to align the photo with the physical space in which the two users are co-located. The new user then taps when alignment is achieved, and the process 600 continues at steps 644 and 646 with receiving registration selection and then processing the selected location (or alignment gaze) to register the user into the session.

At step 648 (which may be performed prior to step 640), the control module in the user's MR system acts to mute their speaker because they can directly hear the presenter or other co-located users directly in the shared space. The method 600 continues at 650 with augmenting the user's view through the display element of the MR system with images generated from the registered/aligned 3D model. The method 600 may further include step 656 which involves augmenting the view of the physical space with additional collaboration imagery. This imagery may include generating and displaying sight line representations or "lasers" from the other co-located users lined up with each of these co-located collaborators' viewpoint and current location in the space to show where each is presently looking during the session. The method 600 may then (or at an earlier time when the presenter or the new user quits the session or turns off their MR system) end at 690 or may involve repeating steps 650 and 656 as the session continues.

If the user is remote from the presenter, the method 600 at 630 branches to step 660 where the new user is prompted by their local collaboration control module/MR system to register their space or room. Step 665 determines whether or not they have said yes/accepted registration prompt. If not, the method 600 continues with repeating step 660. If yes at 665, the method 600 continues at 670 with performing 1-click (or 1-point) registration as discussed with reference to FIG. 3. Next, at step 674, the method 600 continues with placing the user into anchoring mode, and a next tap or selection by the user that is sensed by their MR system's sensors will anchor the 3D model to their room/space. Step 678 is performed by the collaboration control module once a tap/selection is received at 676 to anchor the 3D model to the space and to then place the user in the collaboration session, and step 678 may also include muting speakers for co-located users in the space. Note, if another collaborator joins the session in this space, this new collaborator would be "co-located" or local to the first user to register the space and steps 640-656 may be performed for this second user in the space (and additional users in this space).

In step 680, their view of the space is augmented with imagery from the 3D model and, in some cases, other images such as an avatar of the presenter and/or other collaborators in the session that are remote from the space. The method 600 may end at 690 or continue with repeating step 680 until the end of the session.

Figure 7:
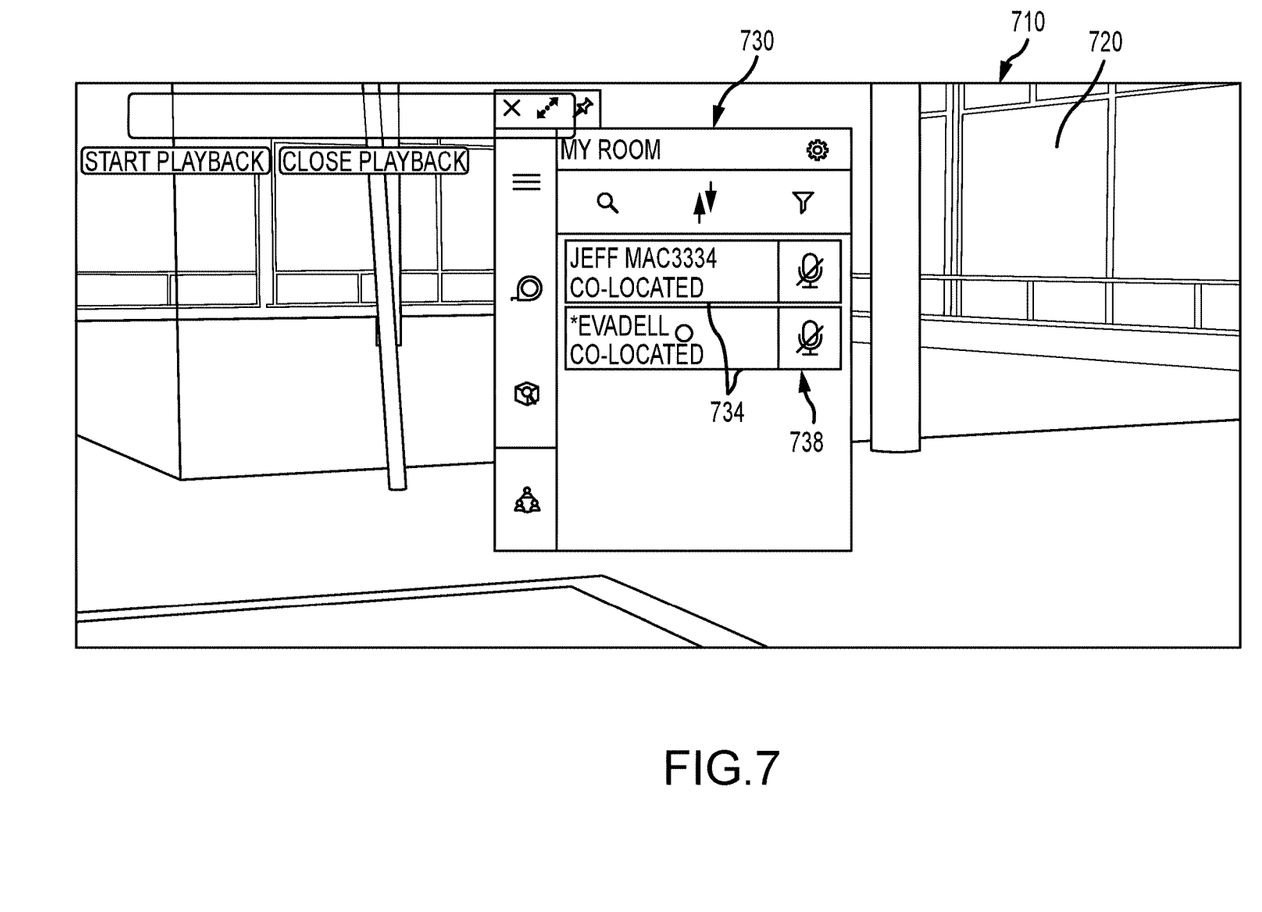
FIG. 7 illustrates a screen shot of a user's view through a display element of an MR system when a status of the session's collaborators or other users is used to augment the viewed space.

FIG. 7 illustrates a screen shot of a user's view 710 through a display element of an MR system when a status of the session's collaborators or other users is used to augment the viewed space 720. As shown, a dialog or popup box 730 is provided as augmentation imagery, which may be generated when the user selects a function in their GUI to detect other users in the collaboration session (e.g., selects an in-session autodetect or similar function). The box 730 is configured to display a status bar 734 for each of the other users/collaborators detected by the collaboration control module as being active in the session, and additional information may be provided such as whether the user/collaborator is co-located to the requesting user or remote and whether or not that user's microphone has been muted (so as to only hear their direct speech in the space when co-located or the like) as shown with icons 738.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A system for providing a mixed reality (MR) environment with collaborative and concurrent access to the MR environment, comprising:
   a display element;
   memory storing a three dimensional (3D) model; and
   a processor running a collaboration control module receiving from a user a request to initiate a collaboration session with the 3D model or to join the collaboration session and, in response, operating the display element to display an image generated from the 3D model to augment a view of a physical space in which the user is positioned,
   wherein the collaboration control module operates the display element to display a prompt to register the user within the physical space,
   wherein the collaboration control module receives a user selection of a location in the physical space and, in response, registers the user and the system for providing the MR environment to the physical space, and
   wherein the collaboration control module registers the user and the system for providing the MR environment to the physical space using a 1-click registration algorithm including operating the display element to prompt the user to select a location on a vertical surface in a surface reconstruction mesh of the physical space.

2. The system of claim 1, wherein the 1-click registration algorithm includes receiving a location selection on a vertical surface in the surface reconstruction mesh and processing the location selection to determine a location on the vertical surface and a normal to the vertical surface to register the user to the physical space.

3. The system of claim 2, wherein the collaboration control module captures an image of the physical space from a viewpoint of the user during the receiving of the location selection and wherein the collaboration control module prompts a second user running a collaboration control module on a local MR system and located in the physical space to register the 3D model to the physical space by aligning a displayed copy of the image with a current view through the local MR system of the physical space.

4. The system of claim 2, wherein the collaboration control module receives a location selection from the user for a point in the physical space and, in response, anchors the 3D model to the physical space.

5. The system of claim 1, wherein the collaboration control module operates, in response to input from the user, in a first operating mode in which other active users in the collaboration session have their location or view tethered to a location or view of the user relative to the 3D model and in a second operating mode with which the other active users are able to roam independently relative to the 3D model.

6. The system of claim 1, wherein the collaboration control module operates to monitor locations of other users in the collaboration session and, in response, to generate and display an avatar for the other users that are physically remote in the display element of the user.

7. The system of claim 1, wherein the collaboration control module operates to monitor locations and lines of sight of other users in the collaboration session and, in response, to display a linear element in the display element representing the lines of sight of the other users from the monitored locations.

8. A method for collaboratively using a 3D model in an MR environment, comprising:
   receiving a selection of a 3D model from a user of an MR device acting as a presenter in a collaboration session;
   using a one-click registration algorithm to register the user acting as the presenter and the MR device to a physical space;
   after the using of the one-click registration algorithm, displaying an image generated using the 3D model with a view of the physical space to the user acting as the presenter via the MR device; and
   receiving user input from the user acting as the presenter designating whether additional users in the collaboration session are able to roam independently relative to the 3D model or are restrained to a location or view of the user acting as the presenter relative to the 3D model.

9. The method of claim 8, wherein the one-click registration algorithm includes operating the display element to prompt the user acting as the presenter to select a location on a vertical surface in a surface reconstruction mesh of the physical space.

10. The method of claim 9, wherein the one-click registration algorithm includes receiving a location selection on a vertical surface in the surface reconstruction mesh and processing the location selection to determine a location on the vertical surface and a normal to the vertical surface to register the user acting as the presenter to the physical space.

11. The method of claim 8, further comprising transmitting a position of the user acting as the presenter to an additional user in the collaboration session and displaying an avatar corresponding to the user acting as the presenter to the additional user based on the position.

12. The method of claim 8, further comprising receiving a request to join the collaboration session from an additional user, determining whether the additional user is located in the physical space or in a remote space, when the additional user is in the physical space prompting alignment with display of a registration image, and when the additional user is outside the physical space using the one-click registration algorithm to register the additional user.

13. The method of claim 8, further comprising monitoring locations of other users in the collaboration session and, in response, displaying an avatar for each of the other users in the display element of the user acting as the presenter.

14. The method of claim 8, further comprising monitoring locations and lines of sight of other users in the collaboration session and displaying a linear element in the display element representing the lines of sight of the other users from the monitored locations.

15. A system for providing a mixed reality (MR) environment with collaborative and concurrent access to the MR environment, comprising:

a display element;

memory storing a three dimensional (3D) model; and a collaboration control module receiving from a first user a request to initiate a collaboration session including selection of the 3D model or a request from a second user to join the collaboration session and, in response, operating the display element to display an image generated from the 3D model to augment a view of a physical space in which the first user or the second user is positioned, wherein the collaboration control module operates, in response to input from the first user, in a first operating mode in which other active users in the collaboration session have their location or view tethered to a location or view of the first user relative to the 3D model and in a second operating mode with which the second user is able to roam independently from the first user relative to the 3D model, wherein the collaboration control module operates the display element to display a prompt to register the first user or the second user within the physical space, wherein the collaboration control module receives a user selection of a location in the physical space and, in response, registers the first user or the second user to the physical space, and wherein the collaboration control module registers the user to the physical space using a 1-click registration algorithm including operating the display element to prompt the user to select a location on a vertical surface in a surface reconstruction mesh of the physical space displayed via the display element.

16. The system of claim 15, wherein the collaboration control module operates to monitor locations of other users in the collaboration session and, in response, to generate and display an avatar for one or more of the other users in the display element of the second user when the one or more of the other users are determined to be physically remote to the second user.

17. The system of claim 15, wherein the 1-click registration algorithm includes receiving a location selection on a vertical surface in the surface reconstruction mesh and processing the location selection to determine a location on the vertical surface and a normal to the vertical surface to register the first user or the second user to the physical space.

18. The system of claim 15, wherein the collaboration control module operates to monitor locations and lines of sight of other users in the collaboration session and, in response, to display a linear element in the display element representing the lines of sight of the other users from the monitored locations to at least one of the first and second users.

* * * * *